(12) United States Patent
Halse et al.

(10) Patent No.: US 9,717,258 B2
(45) Date of Patent: Aug. 1, 2017

(54) CONSTANT DIAMETER PUMPING SYSTEM AND METHOD

(71) Applicant: David W. Falkjar, Upper Letang (CA)

(72) Inventors: Joel Halse, Saint Andrews (CA); David W. Falkjar, Upper Letang (CA)

(73) Assignee: COOKE AQUACULTURE INC., Blacks Harbour, New Brunswick (CA)

( * ) Notice: Subject to any disclaimer, the term of this patent is extended or adjusted under 35 U.S.C. 154(b) by 221 days.

(21) Appl. No.: 14/121,860

(22) Filed: Oct. 28, 2014

(65) Prior Publication Data
US 2016/0113298 A1 Apr. 28, 2016

(51) Int. Cl.
*B65G 53/30* (2006.01)
*A22C 25/08* (2006.01)

(52) U.S. Cl.
CPC ............. *A22C 25/08* (2013.01); *B65G 53/30* (2013.01)

(58) Field of Classification Search
CPC ........ B65G 51/01; B65G 53/30; B65G 53/44; B65G 53/525; B65G 67/603; A22C 25/08
USPC ................... 406/106, 153, 50, 86, 141, 192
See application file for complete search history.

(56) References Cited

U.S. PATENT DOCUMENTS

| 2,736,121 | A | | 2/1956 | Kimmerle |
| 2,943,578 | A | | 7/1960 | McCombie |
| 3,038,760 | A | | 6/1962 | Crooke |
| 3,413,039 | A | * | 11/1968 | Asgeirsson ............ A22C 25/08 406/146 |
| 3,583,365 | A | | 6/1971 | Harden |
| 3,795,325 | A | * | 3/1974 | McLean ................. B63B 27/22 406/40 |
| 3,871,332 | A | | 3/1975 | Hayashi |
| 3,918,116 | A | * | 11/1975 | Valdespino ............ A23N 12/02 15/3.13 |
| 4,000,927 | A | * | 1/1977 | Sakamoto ............... B65G 51/01 406/109 |
| 4,046,996 | A | * | 9/1977 | Williams ............. A01K 61/001 119/215 |

(Continued)

FOREIGN PATENT DOCUMENTS

| GB | 2042641 B | 9/1980 |
| JP | 5544486 | 3/1980 |

(Continued)

*Primary Examiner* — Joseph Dillon, Jr.
(74) *Attorney, Agent, or Firm* — Bereskin & Parr LLP/S.E.N.C.R.L., s.r.l.

(57) ABSTRACT

The pumping system includes a pipe section having a uniform inside diameter, and a production water piping circuit connected to branch pipes on the upstream and downstream ends of the pipe section, forming a loop with the pipe section. The production water circuit comprises a pump and valves for pumping production water into the pipe section through the inlet branch pipe and out through the outlet branch pipe. There is also provided a method for pumping upload water and fish along the pipe section, comprising the steps of drawing production water out of the pipe section through the downstream end of the pipe section, and simultaneously inducing a flow of upload water and fish through the pipe section. The method also includes the step of pumping production water into an upstream end of the pipe section and causing a flow of upload water and fish along the pipe section.

8 Claims, 4 Drawing Sheets

(56) References Cited

U.S. PATENT DOCUMENTS

| | | | |
|---|---|---|---|
| 4,154,484 A * | 5/1979 | Holzenberger | B65G 53/30 406/106 |
| 4,193,737 A | 3/1980 | Lemmon | |
| 4,293,250 A | 10/1981 | Hayashi | |
| 4,449,862 A * | 5/1984 | Beck | B01F 5/0057 37/195 |
| 4,490,044 A * | 12/1984 | Saito | B65G 53/30 222/57 |
| 4,551,042 A * | 11/1985 | Hagedorn | A01K 79/00 406/153 |
| 4,558,990 A | 12/1985 | Roach | |
| 4,586,853 A * | 5/1986 | Sweeney | B65G 53/30 406/103 |
| 4,611,955 A * | 9/1986 | Doerr | B01D 21/2477 406/115 |
| 4,702,676 A | 10/1987 | Westfall et al. | |
| 4,756,671 A | 7/1988 | Grimes et al. | |
| 4,768,920 A | 9/1988 | Gurth | |
| 4,770,610 A | 9/1988 | Breckner | |
| 4,826,362 A | 5/1989 | Hayashi | |
| 4,884,925 A * | 12/1989 | Kemp | B65G 53/30 366/165.1 |
| 4,892,123 A * | 1/1990 | Sheehan | B01J 8/0015 141/44 |
| 5,002,463 A | 3/1991 | Breckner et al. | |
| 5,018,946 A | 5/1991 | Breckner et al. | |
| 5,078,579 A | 1/1992 | Ryan | |
| 5,201,877 A * | 4/1993 | Relin | E02F 3/90 15/404 |
| 5,284,388 A * | 2/1994 | Volk | A21C 1/143 366/141 |
| 5,549,422 A * | 8/1996 | Shepard | B65G 53/30 406/153 |
| 5,697,116 A * | 12/1997 | Loferer | A63B 47/04 15/21.2 |
| 5,779,355 A * | 7/1998 | Pullman | F04F 5/20 366/137 |
| 6,161,504 A | 12/2000 | Jungling et al. | |
| 7,462,016 B2 | 12/2008 | Lindgren | |
| 8,109,698 B2 * | 2/2012 | De Greef | B65G 51/01 406/106 |
| 8,230,813 B1 | 7/2012 | Birdwell | |
| 2002/0015621 A1 * | 2/2002 | Vatne | B01D 21/245 406/114 |
| 2003/0185637 A1 * | 10/2003 | D'Aquin | B01D 21/0012 406/103 |
| 2009/0142146 A1 * | 6/2009 | Opatril | B65G 51/01 406/10 |
| 2009/0252563 A1 * | 10/2009 | Gillespie | F03B 17/04 406/106 |
| 2011/0047743 A1 * | 3/2011 | Shepherd | B65G 53/14 15/320 |
| 2011/0188949 A1 * | 8/2011 | Foody, Sr. | B65G 53/30 406/117 |
| 2011/0311321 A1 * | 12/2011 | Trueman | E21F 13/042 406/146 |
| 2013/0336730 A1 * | 12/2013 | Alenizi | B65G 53/30 406/108 |
| 2015/0016898 A1 * | 1/2015 | Hockett | B65G 47/684 406/108 |
| 2017/0000094 A1 * | 1/2017 | Bartsch | A01K 79/00 |

FOREIGN PATENT DOCUMENTS

| | | |
|---|---|---|
| JP | S57203614 A | 12/1982 |
| JP | 61140413 | 6/1986 |
| WO | WO02078436 A1 | 10/2002 |

\* cited by examiner

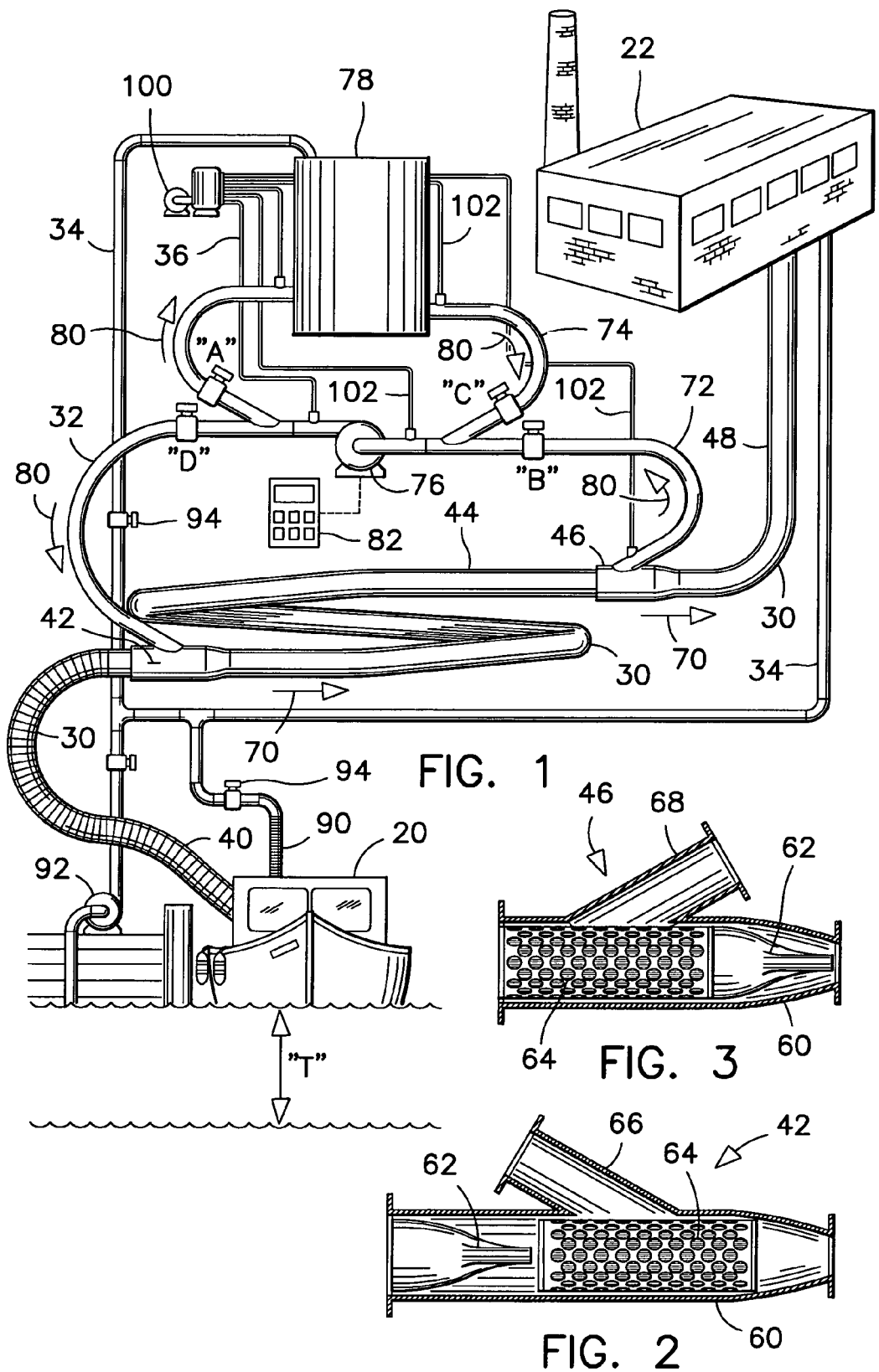

CONSTANT DIAMETER PUMPING SYSTEM AND METHOD

FIELD OF THE PRESENT INVENTION

The present invention pertains to the field of fish pumps, and more particularly, it pertains to pumping systems having constant diameter piping there-through, making it particularly appropriate for moving large fish without bruising or otherwise damaging the fish.

BACKGROUND OF THE PRESENT INVENTION

Fish pumps are used in the fishing industry to transfer fish from a fishing vessel to a fish processing plant, for example: Fish pumps found in the prior art are not usually designed to prevent shock and stress to the fish being moved. As may be appreciated from the following examples of fish pumps found in the prior art, fish being transported by conventional fish pumping systems are submitted to large gradients of push and pull forces, and shocks from funnelling passages and other piping constrictions.

A first example of a fish pumping system found in the prior art includes
U.S. Pat. No. 2,736,121 issued to H. J. Kimmerle on Feb. 28, 1956. In this type of pumping installation, the fish are drawn from a fishnet by vacuum pressure and fed through a rotary valve and into the hold of a boat. The rotary valve is required for maintaining the system under vacuum pressure.

Other types of vacuum-type fish pumps are described in:
U.S. Pat. No. 3,583,365 issued to D. G. Harden on Jun. 8, 1971;
U.S. Pat. No. 3,871,332 issued to T. Hayashi on Mar. 18, 1975;
U.S. Pat. No. 4,293,250 issued to T. Hayashi on Oct. 6, 1981;
U.S. Pat. No. 4,770,610 issued to R. A. Breckner on Sep. 13, 1988;
U.S. Pat. No. 4,826,362 issued to T. Hayashi on May 2, 1989;
U.S. Pat. No. 5,002,463 issued to R. A. Breckner et al., on Mar. 26, 1991;
U.S. Pat. No. 5,078,579 issued to R. M. Ryan on Jan. 7, 1992;
U.S. Pat. No. 6,161,504 issued to W. W. Jungling et al., on Dec. 19, 2000;
The fish pumps included in this latter group of patents all have a large tank where a vacuum pressure is created. Fish and upload water from a first location are drawn through a one-way valve and into the large tank. When the tank is full, the pressure inside the tank is changed from a vacuum pressure to a positive pressure to force the fish and water out of the tank, through a second one-way valve and toward a second location.

In a third group of fish pumps from the prior art, the following publications were found:
U.S. Pat. No. 4,558,990 issued to S. W. Roach on Dec. 17, 1985;
U.S. Pat. No. 4,702,676 issued to A. P. Westfall et al. on Oct. 27, 1987;
U.S. Pat. No. 4,756,671 issued to E. L. Grimes on Jul. 12, 1988;
U.S. Pat. No. 7,462,016 issued to P. B. Lindgren on Dec. 9, 2008;

These installations are related to jet pumps where a stream of air or water is fed into the nozzle of a large hose. This stream of air or water induces a negative pressure in the nozzle thereby drawing upload water and fish through the nozzle of the hose and into the hose.

In yet another type of fish pump found in the prior art, the following documents describe pumps with special impellers to minimize damage to the fish.
U.S. Pat. No. 4,193,737 issued to G. H. Lemmon on Mar. 18, 1980;
U.S. Pat. No. 4,768,920 issued to M. I. Gurth on Sep. 6, 1988.
In the first-mentioned pump, the impeller has large helical-spiral passages allowing fish and water to pass through the pump without being caught by the impeller. In the second-mentioned pump, the impeller is a disc-type blade-less impeller so that fish and upload water are drawn through the pump and moved by friction force only without shock to the fish.

Although the fish pumps of the prior art deserve undeniable merits, there is still a need in the fish processing industry for a gentle pumping system that is particularly suitable for handling large quantities of relatively big fish without bruising the fish. More particularly, there is a need in the fish processing industry for a fish pumping system capable of gently handling 4,000 to 6,000 farmed salmon per hour, wherein each fish can weigh up to 12 kg.

SUMMARY OF THE PRESENT INVENTION

In the present invention, there is provided a constant-diameter pumping system that is particularly suitable for pumping large salmon without bruising or otherwise damaging the fish.

In a first aspect of the present invention, there is provided a constant-diameter pumping system for moving upload water and fish there along. The constant-diameter fish pumping system includes basically a buffer pipe section having a uniform inside diameter. This buffer pipe section has an inline inlet one-way valve at an inlet end thereof and an inline outlet one-way valve at an outlet end thereof. The inlet one-way valve has an inlet branch pipe extending therefrom and the outlet one-way valve has an outlet branch pipe extending therefrom. The constant-diameter pumping system also includes a production water piping circuit connected to the inlet branch pipe and to the outlet branch pipe and forming a loop with the buffer pipe section. The production water circuit comprises a pump for pumping production water into the buffer pipe section through the inlet branch pipe and out from the buffer pipe section through the outlet branch pipe. The production water circuit also has valves for alternately controlling a flow of production water in and out of the buffer pipe section for moving upload water and fish along the buffer pipe section.

In a second aspect of the present invention, there is provided a method for pumping fish along a constant-diameter pipe section, comprising the steps of:
  filling the pipe section with production water;
  drawing the production water out of the pipe section through a downstream end of the pipe section and simultaneously inducing a flow of upload water and fish through an upstream end of the pipe section;
  pumping production water into the upstream end of the pipe section and causing a flow of upload water and fish along the pipe section and out of the pipe section through the downstream end of the pipe section.

This brief summary has been provided so that the nature of the invention may be understood quickly. A more complete understanding of the invention can be obtained by reference to the following description of the preferred embodiment thereof in connection with the attached drawings.

BRIEF DESCRIPTION OF THE DRAWINGS

FIG. 1 is a schematic view of the constant-diameter pumping system according to the preferred embodiment of the present invention;

FIG. 2 is a longitudinal cross-section view of the inlet one-way valve used in the preferred pumping system;

FIG. 3 is a longitudinal cross-section view of the outlet one-way valve used in the preferred pumping system;

DETAILED DESCRIPTION OF THE PREFERRED EMBODIMENT

Figure 4:
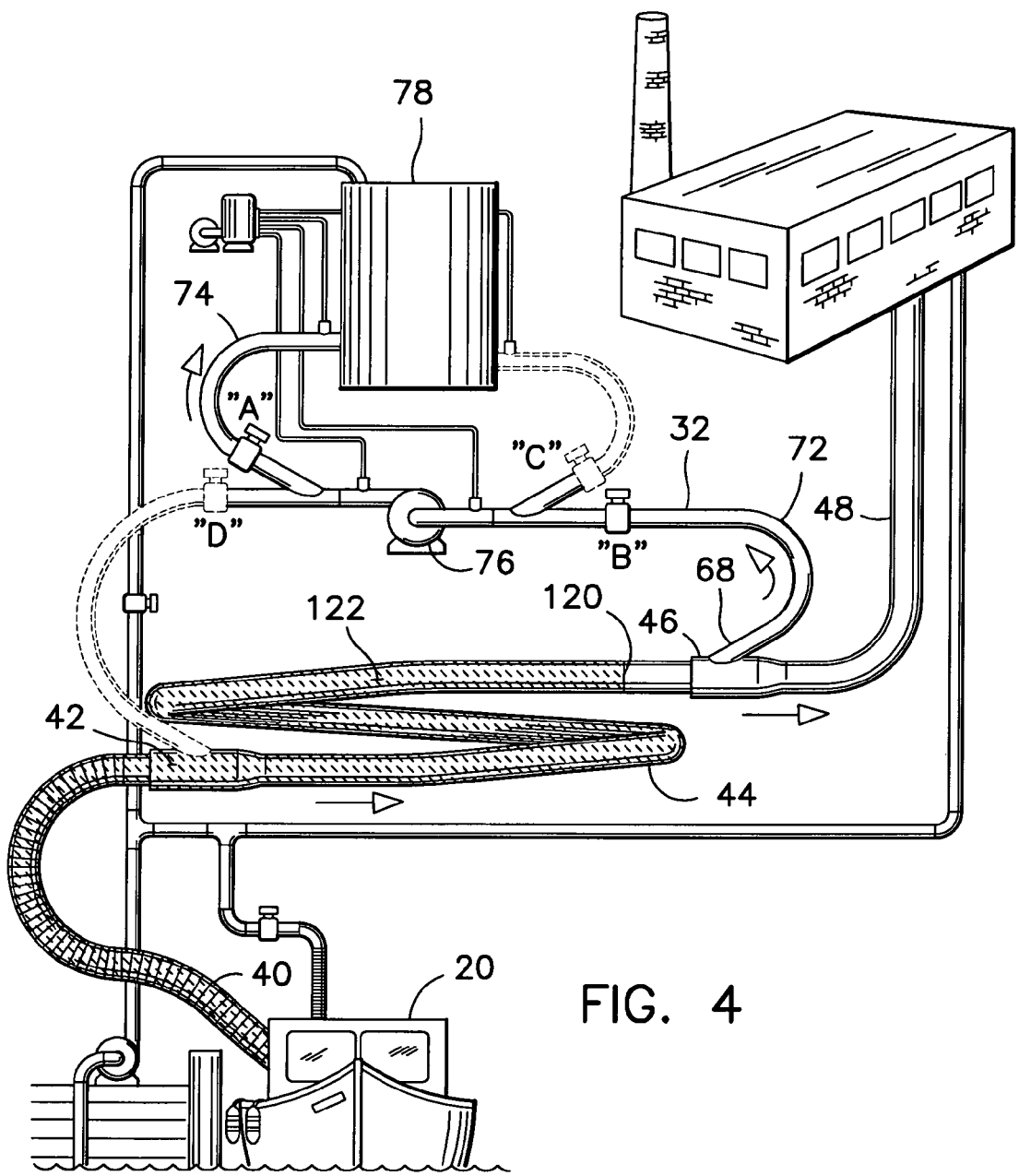
FIG. 4 is a schematic view of the constant-diameter pumping system according to the preferred embodiment of the present invention, showing a first haul of upload water and fish being moved to a first position there along during a first pumping phase.

The preferred embodiment of the constant-diameter pumping system according to the present invention is described herein below with reference to the attached drawings.

Referring to FIG. 1, label 20 is used to designate a fishing boat and label 22 is used to designate a fish processing plant where a load of fish is being transferred from the boat 20.

The piping system illustrated in FIG. 1, includes four sub-systems being identified by four different pipe sizes, to facilitate the understanding of the drawings. The first sub-system is a constant-diameter fish-path pipe 30. The inside diameter along this fish-path pipe 30 is a same substantially large diameter. The fish-path pipe 30 extends from the fishing boat 20 to the fish processing plant 22.

The second sub-system is a production water circuit 32. The production water circuit 32 is used to force a flow of water along the constant-diameter fish-path pipe 30. The third sub-system is the offload and makeup water piping 34 to replenish the previously-mentioned sub-systems with water. The fourth sub-system is the priming system 36 to remove air from the entire pumping system.

Referring firstly to the constant-diameter fish-path pipe 30, this piping system has a constant diameter, preferably something within the range of about ten (10) inches to fourteen (14) inches along the full length thereof depending on the size and volume of fish being moved per hour. The constant-diameter fish-path pipe 30 has a flexible upload section 40, capable of being manipulated into the hold of the fishing boat 20. In order to accommodate movement of the boat 20, the upload section 40 may be made of a flexible hose.

The upload section 40 connects to an inline inlet one-way valve 42 on the upstream end of a buffer pipe section 44. The buffer pipe section 44 preferably has a length of about sixty (60) to eighty (80) feet. The downstream end of the buffer pipe section 44 connects into an inline outlet one-way valve 46. This outlet one-way valve 46 connects to a fish delivery section 48. The buffer pipe section 44 is illustrated as a coil for convenience only. This buffer pipe section 44 can have many configurations, according to the choice of the designer.

While still making reference to the constant-diameter fish-path pipe 30, it is important to consider that the fishing boat 20 is subjected to the variations of the tides. The tides could vary in height "T" up to thirty (30) feet, such as in the Bay of Fundy, Canada, for example. The fish delivery section 48 may represent a substantial head as well. These pressure losses and the movement of the boat 20 must be considered in the design and operation of the pumping system according to the preferred embodiment of the present invention.

Referring particularly to the inline inlet and outlet one-way valves 42, 46, as can be seen in FIGS. 2 and 3, these valves have a similar construction. Both one-way valves 42, 46, have a casing 60, a duck-bill type flexible one-way or check valve 62, and a strainer 64 mounted inside the casing 60. The strainer 64 is mounted downstream of the check valve 62 in the inlet one-way valve 42 and the strainer 64 is mounted upstream of the check valve 62 in the outlet one-way valve 46. The purpose of the strainers 64 is to separate fish from production water being pump in or out of the buffer section 44. The inline inlet and outlet one-way valves 42, 46 have a water intake branch 66 and a water outlet branch 68 respectively, connecting the production water circuit 32 to the strainer 62 segments of both valves 42, 46. It will be appreciated that the production water is passed through a first strainer 64 prior to pumping it out of outlet branch pipe 68, and this production water is passed through a second strainer 64 when pumping it through the inlet branch pipe 66. Both one-way valves 42, 46 are known in the art and do not constitute the focus of the present invention. They are simply used as elements in the pumping system according to preferred embodiment of the present invention.

The expression "production water" is used herein to designate water that is used to enhance a flow in the buffer pipe section 44. When the buffer pipe section is full of production water, this production water is forcefully drawn from the downstream end of the buffer pipe section to create a negative pressure in the upstream end of the buffer pipe section to enhance a flow of upload water and fish into the buffer pipe section. This production water is also fed under pressure into the upstream end of the buffer pipe section 44 to force the content of the buffer pipe section to move along the buffer pipe section and out through to the downstream end. This production water is re-circulated and used again and again to force a second and subsequent hauls of upload water and fish in and out of the buffer pipe section 44.

Arrows 70 indicate the directions of flow along the constant-diameter fish-path pipe 30.

The production water circuit 32 is made of a first loop 72, a second loop 74, a water pump 76, control valves and a production water reservoir 78. The arrows 80 indicate the directions of flows in both loops 72, 74. The control valves in both loops 72, 74 are labelled "A", "B", "C" and "D".

The pump 76 in the production water circuit 32 in the preferred embodiment of the present invention has a capacity of 1800 gpm at 35 psi. head pressure; and 28 inches of mercury suction pressure. It is a centrifugal-type water pump, driven by a 60 hp. electric motor. The water pump 76 is preferably controlled on and off by a PLC or other automatic controller 82. The same controller 82 is also preferably used to control the opening and closing of the valves "A" , "B", "C" and "D". The capacity of the pump is selected to move the entire content of the buffer pipe section 44 in a relatively short time. The pump 76 is mounted in the production water circuit 32 to pump production water from the downstream end of buffer pipe section 44 to the reservoir 78 and from the reservoir 78 to the upstream end of the buffer pipe section 44.

The offload and makeup water piping 34 system recycles water from the fish processing plant 22 to the production water reservoir 78 basically. This piping system 34 also provides offload water to the fishing vessel 20 along a flexible branch pipe 90. A water makeup branch pipe is also optionally provided and includes a makeup pump 92 for pumping production water into the production water reservoir 78. Valves 94 are installed on this water piping system 34 to control the flow along that system.

Lastly, the priming system 36 includes a vacuum pump 100 and branch pipes 102 each having a connection to a high point in the constant-diameter fish-path pipe 30 and to a high point in the first and second loops 72, 74 of the production water circuit 32. The purpose of the priming system 36 is to remove all the air in the constant-diameter fish-path pipe 30 and the production water circuit 32 to allow the entire system to operate as expected.

Having described the elements of the piping system according to the preferred embodiment of the present invention, the operation of this system will be described.

An initial step in the operation of the preferred system consists of filling the constant-diameter fish-path pipe 30 at least up to the outlet one-way valve 46, and the production water circuit 32 with production water. A second step consists of removing air in these pipes.

Starting with an empty or a near-empty production water reservoir 78; with the buffer pipe section 44 full of production water and with the flexible upload hose 40 extending in the hold of the fishing boat 20; the pump 76 is started with valves "A" and "B" open and valves "C" and "D" closed. The segments of the production water circuit 32 which are not used during the initial pumping phase are shown in light dashed lines in FIG. 4 for presenting a better understanding of the flow through the production water circuit 32 during this first pumping phase.

During this first pumping phase, the pump 76 is operated to draw production water from the buffer pipe section 44 through the branch pipe 68 of the outlet valve 46, and to force this flow of production water into the production water reservoir 78 through valve "A". This flow of production water from the buffer pipe section 44 creates a negative pressure in the flexible upload section 40 to draw upload water and fish along the constant-diameter fish-path pipe 30 and into the buffer pipe section 44. This first haul of upload water and fish has its leading edge at label 120 for example. The shaded area in FIG. 4 represents the first haul of upload water and fish 122 in the constant-diameter fish-path pipe 30.

After a first haul of upload water and fish 122 has been drawn by negative pressure to fill or to nearly fill the buffer pipe section 44, the pump 76 is stopped and the flow control valves are reversed. Valves "A" and "B" are closed and valves "C" and "D" are opened. The pump 76 is operated again in a second pumping phase. During the second pumping phase, the segments of the pump circuit 32 which are not used are shown in light dashed lines in FIG. 5 for presenting a better understanding of the flow through the production water circuit 32 during this second pumping phase.

Figure 5:
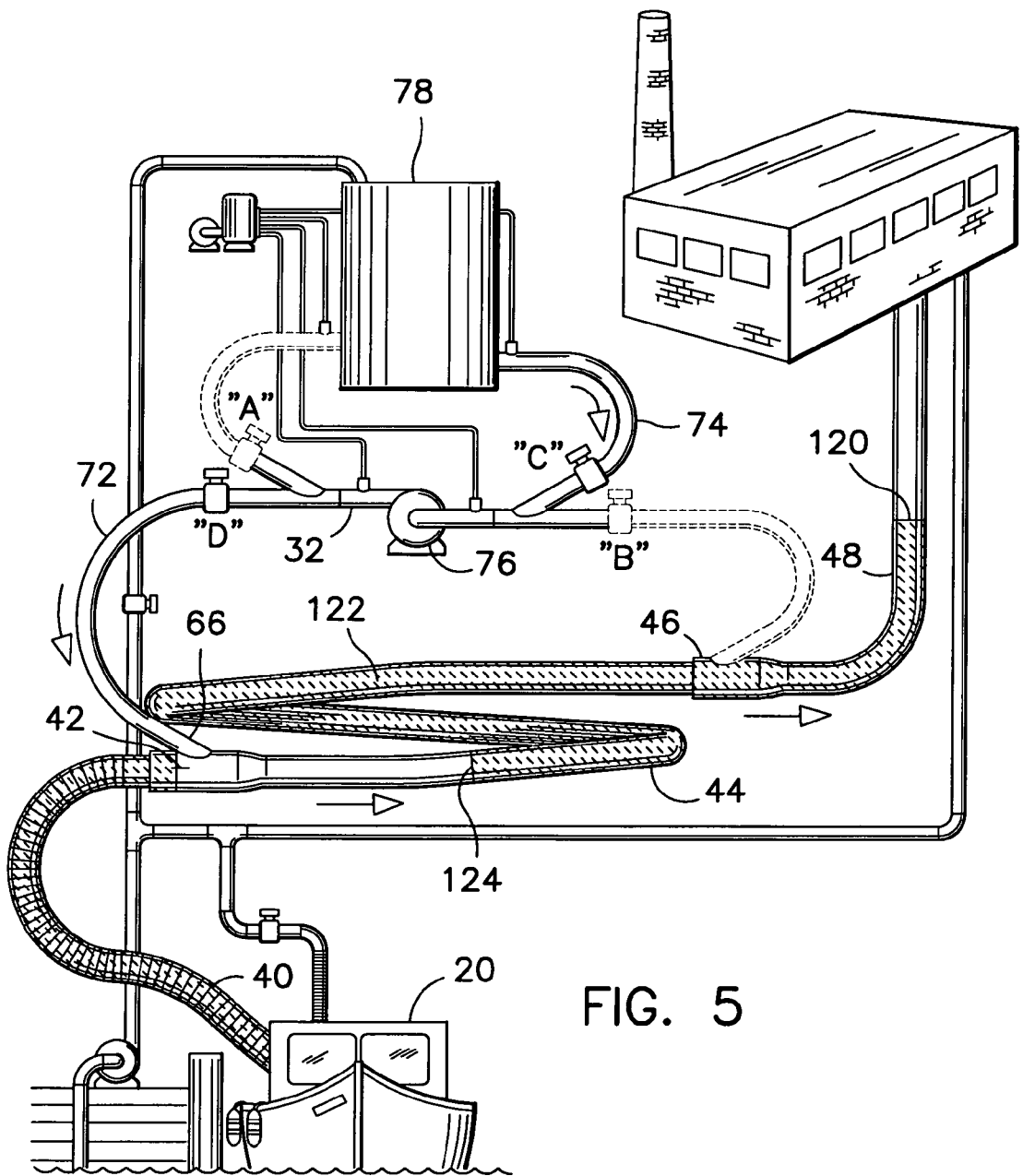
FIG. 5 is a schematic view of the constant-diameter pumping system according to the preferred embodiment of the present invention, showing the first haul of upload water and fish being moved to a second position there along during a second pumping phase.

During the second pumping phase, the pump 76 is operated to draw production water from the production water reservoir 78 and to force this production water into the branch 66 of the inlet one-way valve 42 and into the upstream end of the buffer pipe section 44. The production water being pumped into the buffer pipe section 44, forces the content of the buffer pipe section 44 to move along the buffer pipe section 44 and out through the outlet one-way valve 46. As can be seen in FIG. 5, the leading edge 120 of a first haul of upload water and fish 122 has now been moved into the fish delivery section 48. The production water being forced into the buffer pipe section 44 has created a trailing edge 124 behind this first haul of upload water and fish 122. In FIG. 5, the first haul of upload water and fish 122 is shown in shaded area inside the constant-diameter fish-path pipe 30, between the leading edge 120 and the trailing edge 124.

Figure 6:
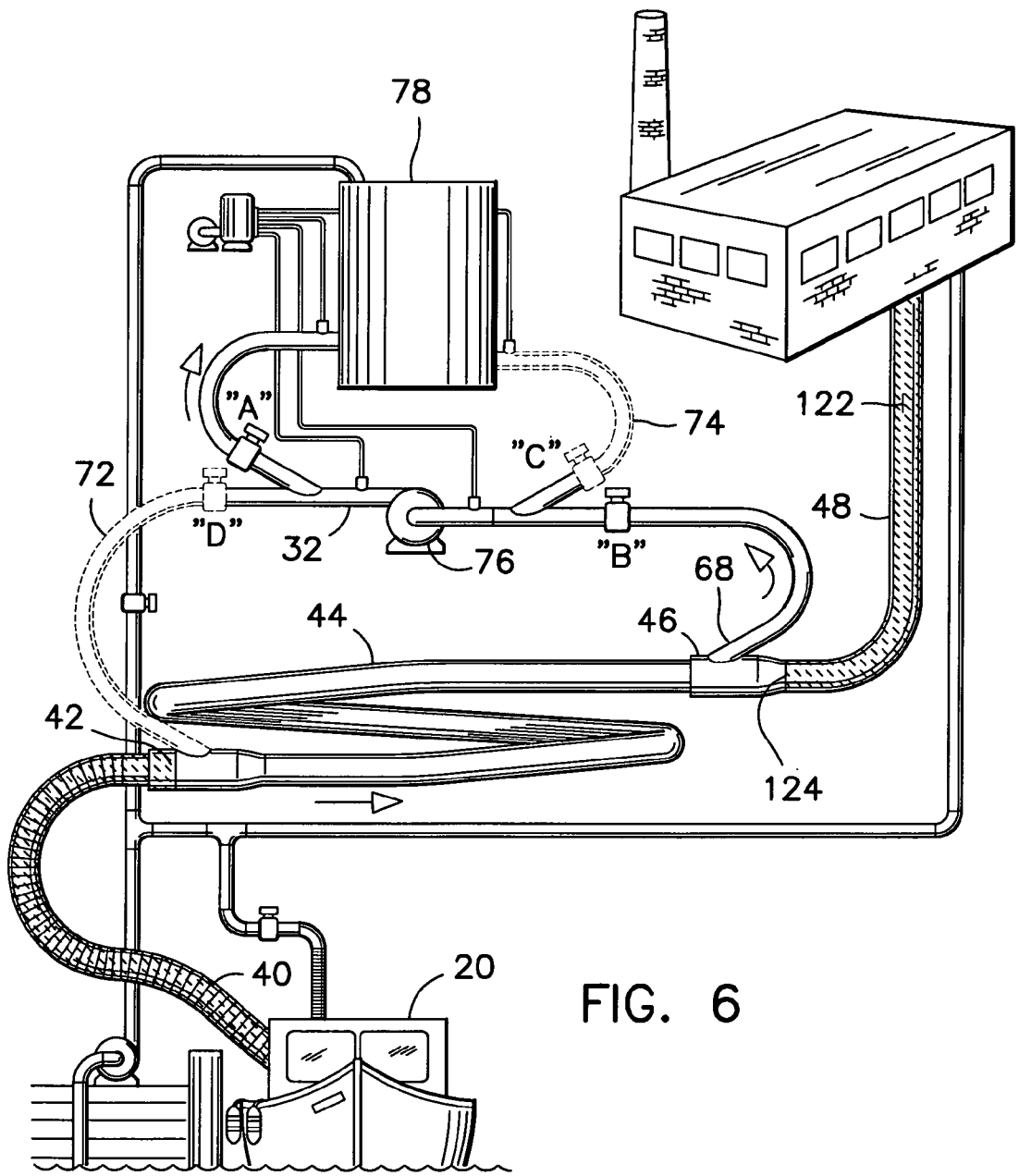
FIG. 6 is a schematic view of the constant-diameter pumping system according to the preferred embodiment of the present invention, showing the location of the first haul of upload water and fish at the end of the second pumping phase, prior to pumping a second haul of upload water and fish into the buffer pipe section.

When the first haul of upload water and fish 122 in the buffer pipe section 44 has been moved out through the outlet one-way valve 46, the pump 76 is stopped and the control valves are operated. Valves "C" and "D" are closed, and valves "A" and "B" are opened, as illustrated in FIG. 6. The pump 76 is started again to repeat the pumping cycle. The pump 76 is operated again to repeat the first pumping phase and to draw production water out from the buffer pipe section 44 and by the same action, to draw by negative pressure a second haul of upload water and fish into the buffer pipe section 44.

The first and second pumping phases mentioned above are repeated serially until the boat hold is empty. It will be appreciated that the fish delivery section 48 to the fish processing plant 22 contains a constant flow of upload water and fish. The production water content of the buffer pipe section 44 is removed from the buffer pipe section 44 at every second pumping phase.

The duration of each pumping phase is determined so as to move each haul of upload water and fish out of the buffer pipe section 44 and into the fish delivery pipe section 48. The duration of each pumping phase is also determined to prevent losing production water into the fish delivery pipe section 48. In the preferred embodiment, a first and second pumping phase constitutes one pumping cycle, and pumping cycles are repeated at a rate of about every twenty (20) seconds.

The duration of each pumping phase is based on the pressure losses through the system, on the height of the tide "T" at the time of unloading a boat, and on the length and diameter of the buffer pipe section 44. The duration of each pumping phase is calculated so as to transfer the full content of the buffer pipe section 44, or slightly less than the full content during each phase. Therefore, the first pumping phase may have a duration of twelve (12) seconds during high tide for example, and the second pumping phase may have a duration of six to eight (6-8) seconds. Therefore, the cycling of the pump 76 and of the control valves "A", "B", "C" and "D" is better effected by a PLC or other automatic control 82 that is capable of accommodating different uploading conditions and different pumping cycle times.

A method for moving fish and upload water through the constant-diameter pumping system is described generally as follows:

providing a buffer pipe section 44 having a substantial diameter and length, an inlet one-way valve 42 on an upstream end of the buffer pipe section and an outlet one-way valve 46 on a downstream end of the buffer pipe section;

providing a fish upload pipe section 40 connected to the inlet one-way valve 42 and a fish delivery pipe 48 connected to the outlet one-way valve 46; wherein the upload pipe section and the fish delivery pipe have a same inside diameter as the buffer pipe section;

filling the fish upload pipe section 40 and the buffer pipe section 44 with production water;

pumping the production water out of the buffer pipe section 44 through the outlet one-way valve 46, thereby drawing upload water and fish by negative pressure through the fish upload pipe section 40; through the inlet one-way valve 42 and partly filling the buffer pipe section 44 with a first haul of upload water and fish 122;

pumping production water into the buffer pipe section 44 through the inlet one-way valve 42 and pushing the first haul of upload water and fish 122 along the buffer pipe section 44 and out of the buffer pipe section 44 through the outlet one-way valve 46;

repeating the steps of pumping production water out and in the buffer pipe section 44 thereby causing upload water and fish 122 to move along the constant-diameter pumping system.

The constant-diameter piping system according to the preferred embodiment of the present invention has been used successfully to transport 4,000 to 6,000 fish/hr., wherein each fish was weighing between 4 and 12 kg. In the installation tested, the constant diameter fish path pipe 30 had a vertical rise of 55 to 60 feet and a horizontal distance of about 400 feet.

What is claimed is:

1. A fish pumping system for moving upload water and fish, comprising:
   a) an upload pipe section, a buffer pipe section, and a fish delivery pipe section, wherein the upload pipe section, buffer pipe section, and fish delivery pipe section have a same constant inside diameter;
   b) a one-way inlet valve between the upload pipe section and the buffer pipe section and a one way outlet valve between the buffer pipe section and the fish delivery pipe section, and a respective strainer in each of the inlet valve and the outlet valve;
   c) an inlet branch pipe extending from the inlet valve and an outlet branch pipe extending from the outlet valve;
   d) a production water piping circuit and a reservoir connected to the inlet branch pipe and to the outlet branch pipe and forming a loop with the buffer pipe section, the production water circuit comprising a pump and valves, the production water circuit serially (1) pumping production water out from the buffer pipe section through the outlet branch pipe to the reservoir, to draw upload water and fish from the upload pipe section into the buffer pipe section through the inlet valve, and (2) pumping production water from the reservoir into the buffer pipe section through the inlet branch pipe, to move the upload water and fish out of the buffer pipe section through the outlet valve into the fish delivery pipe.

2. The fish pumping system as claimed in claim 1, further comprising a vacuum system for removing air from said buffer pipe section and said from said production water piping circuit.

3. The fish pumping system as claimed in claim 1, further comprising a water makeup pipe circuit for recycling said upload water.

4. The fish pumping system as claimed in claim 1, further comprising a controller for controlling an operation of said pump and said valves based on at least one of uploading conditions and pumping cycle times.

5. The fish pumping system as claimed in claim 1, wherein said inside diameter is between about 10 inches and 14 inches.

6. The fish pumping system as claimed in claim 5, wherein said buffer pipe section has a length of at least 60 feet.

7. The fish pumping system as claimed in claim 1, wherein said outlet branch pipe is upstream from said outlet valve, and said inlet branch pipe is downstream from said inlet valve.

8. The fish pumping system of claim 3, wherein said makeup pipe circuit includes a makeup pump for pumping makeup water into said production water piping circuit.

* * * * *